(12) United States Patent
Priest et al.

(10) Patent No.: US 7,930,452 B1
(45) Date of Patent: Apr. 19, 2011

(54) PARALLEL LINK ELECTRICAL AND TIMING PARAMETER SPECIFICATION FOR OUTPUT DRIVER AND INPUT RECEIVER THAT SELECTS BANDWIDTH OR FREQUENCY BASED ON TIMING PARAMETERS

(75) Inventors: Judith Ying Priest, Palo Alto, CA (US); Ronnie Ka Lai Poon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 613 days.

(21) Appl. No.: 11/810,558

(22) Filed: Jun. 5, 2007

(51) Int. Cl.
*G06F 3/00* (2006.01)
*H04L 27/00* (2006.01)
*H02H 3/05* (2006.01)

(52) U.S. Cl. .............. 710/58; 710/1; 710/106; 714/43; 714/724; 714/25; 326/30; 326/32; 330/285; 330/295

(58) Field of Classification Search .............. 710/1, 58; 330/289, 295
See application file for complete search history.

(56) References Cited

U.S. PATENT DOCUMENTS

| | | | | |
|---|---|---|---|---|
| 5,986,522 | A * | 11/1999 | Asakawa et al. | 333/189 |
| 6,163,499 | A * | 12/2000 | Suzuki | 365/230.06 |
| 6,192,496 | B1 * | 2/2001 | Lawrence et al. | 714/724 |
| 6,366,972 | B1 * | 4/2002 | Grebenkemper et al. | 710/106 |
| 6,425,097 | B1 * | 7/2002 | Elachkar et al. | 714/43 |
| 6,727,762 | B1 * | 4/2004 | Kobayashi | 330/295 |
| 6,922,074 | B2 * | 7/2005 | Coughlin et al. | 326/30 |
| 7,110,420 | B2 * | 9/2006 | Bashirullah et al. | 370/465 |
| 7,279,979 | B2 * | 10/2007 | Autti | 330/285 |
| 7,289,572 | B2 * | 10/2007 | Cranford et al. | 375/295 |

OTHER PUBLICATIONS

JEDEC Standard, Bus Interconnect Logic (BIC) for 1.2 Volts, JESD8-16A (Revision of JESD8-16), JEDEC Solid State Technology Association, Nov. 2004.

* cited by examiner

*Primary Examiner* — Tammara Peyton
(74) *Attorney, Agent, or Firm* — Weaver Austin Villeneuve & Sampson LLP

(57) ABSTRACT

In one embodiment, an apparatus includes a driver and a receiver. The driver has an output, wherein the output of the driver has an associated output termination. In addition, the receiver has an input, wherein the input of the receiver has an associated input termination. An interface between the output of the driver and the input of the receiver operates according to a set of one or more timing parameters, wherein the input termination, the output termination, and the set of timing parameters correspond to a bandwidth for data transfer or frequency for data transfer across the interface between the output of the driver and the input of the receiver.

36 Claims, 10 Drawing Sheets

FIG. 3

DC Recommended Operating Conditions ($T_A$ = 0 to 70°C) — 302

| Symbol | Parameter | Min. | Max. | Units |
|---|---|---|---|---|
| $V_{OH}$ (DC) | DC output high voltage | $0.75 * V_{DDQ}$ | $V_{DDQ}$ + 0.15 | Volts |
| $V_{OL}$ (DC) | DC output low voltage | -0.15 | $0.25 * V_{DDQ}$ | Volts |
| $V_{IH}$ (DC) | DC input high voltage | $V_{REF}$ + 0.08 | $V_{DDQ}$ + 0.15 | Volts |
| $V_{IL}$ (DC) | DC input low voltage | -0.15 | $V_{REF}$ - 0.08 | Volts |

FIG. 4

AC Recommended Operating Conditions ($T_A$ = 0 to 70°C) — 402

| Symbol | Parameter | Min. | Nominal | Max. | Units |
|---|---|---|---|---|---|
| $V_{OH}$ (AC) | Minimum output pullup under AC test load | $V_{DDQ}$ - 0.4 | - | $V_{DDQ}$ + 0.24 | V |
| $V_{OL}$ (AC) | Maximum output pulldown under AC test load | -0.24 | - | 0.4 | V |
| $V_{IH}$ (AC) | AC input high voltage | $V_{REF}$ + 0.15 | - | $V_{DDQ}$ + 0.24 | V |
| $V_{IL}$ (AC) | AC input low voltage | -0.24 | - | $V_{REF}$ - 0.15 | V |
| $t_{SLEW}$ | Slew rate | 1.0 | - | - | V/ns |
| $\Delta t_{SLEW}$ | Difference between rising and falling slew rates | - | - | 10% | |

FIG. 9

Absolute maximum Ratings — 900

| Parameter | Min. | Max. |
|---|---|---|
| Voltage on $V_{DDQ}$ relative to $V_{SS}$ | −0.2 | 1.4 |
| Input voltage | −0.2 | 1.5 |

Input/Output Capacitances (without package) — 1002

| Parameter | Typical | Max. | Units |
|---|---|---|---|
| Address & control input capacitance | 2 | 3 | pF |
| Data input and output capacitance | 2 | 3 | pF |
| Clock input and output capacitance | 2 | 3 | pF |

Input/Output Capacitances (with package) — 1020

| Parameter | Typical | Max. | Units |
|---|---|---|---|
| Address & control input capacitance | 3.5 | 4.5 | pF |
| Data input capacitance | 3.5 | 4.5 | pF |
| Clock input capacitance | 3.5 | 4.5 | pF |
| Data output capacitance | 3.5 | 4.5 | pF |
| Clock output capacitance | 3.5 | 4.5 | pF |

1022, 1024, 1026, 1028, 1030, 1032, 1034, 1036

| | Parameter | Symbol | 1.0 Gbps | | 600 Mbps | | Units |
|---|---|---|---|---|---|---|---|
| | | | Min | Max | Min | Max | |
| | Clocks | | | | | | |
| 1112 | SysclkTxH, sysclkTxL cycle time | $t_{SCTHSCTH}$ | 2.0 | - | 3.33 | - | ns |
| 1114 | SysclkRxH, sysclkRxL cycle time | $t_{SCRHSCRH}$ | 2.0 | - | 3.33 | - | ns |
| 1116 | RclkH, RclkL cycle time | $t_{RHRH}$ | 2.0 | - | 3.33 | - | ns |
| 1118 | TclkH, TclkL cycle time | $t_{THTH}$ | 2.0 | - | 3.33 | - | ns |
| 1120 | Short term sysclkTx phase jitter | $t_{SCTJ}$ | - | 80 | - | 133 | ps |
| 1122 | Short term sysclkRx phase jitter | $t_{SCRJ}$ | - | 80 | - | 133 | ps |
| 1124 | Short term Rclk phase jitter | $t_{RCJ}$ | - | 80 | - | 133 | ps |
| 1126 | Short term Tclk phase jitter | $t_{TCJ}$ | - | 80 | - | 133 | ps |
| 1128 | Max long term input jitter | $t_{LTIJ}$ | - | 70 | - | 70 | ps |
| 1130 | SysclkTxH, sysclkTxL HIGH pulse width | $t_{SCTHSCTL}$ | 0.9 | - | 1.5 | - | ns |
| 1132 | SysclkTxH, sysclkTxL LOW pulse width | $t_{SCTLSCTH}$ | 0.9 | - | 1.5 | - | ns |
| 1134 | SysclkRxH, sysclkRxL HIGH pulse width | $t_{SCRHSCRL}$ | 0.9 | - | 1.5 | - | ns |
| 1136 | SysclkRxH, sysclkRxL LOW pulse width | $t_{SCRLSCRH}$ | 0.9 | - | 1.5 | - | ns |
| 1138 | RclkH, RclkL HIGH pulse width | $t_{RHRL}$ | 0.9 | - | 1.5 | - | ns |
| 1140 | RclkH, RclkL LOW pulse width | $t_{RLRH}$ | 0.9 | - | 1.5 | - | ns |
| 1142 | TclkH, TclkL HIGH pulse width | $t_{THTL}$ | 0.9 | - | 1.5 | - | ns |
| 1144 | TclkH, TclkL LOW pulse width | $t_{TLTH}$ | 0.9 | - | 1.5 | - | ns |
| 1146 | SysclkTxH clock to SysclkTxL | $t_{SCTHSCTLH}$ | $0.5 * t_{SCTHSCTH} -100$ | $0.5 * t_{SCTHSCTH} +100$ | $0.5 * t_{SCTHSCTH} -167$ | $0.5 * t_{SCTHSCTH} +167$ | ps |

*FIG. 11A*

| Parameter | Symbol | 1.0 Gbps Min | 1.0 Gbps Max | 600 Mbps Min | 600 Mbps Max | Units |
|---|---|---|---|---|---|---|
| SysclkRxH clock to SysclkRxL | $t_{SCRHSCRLH}$ | $0.5* t_{SCRHSCRH} -100$ | $0.5* t_{SCRHSCRH} +100$ | $0.5* t_{SCRHSCRH} -167$ | $0.5* t_{SCRHSCRH} +167$ | ps |
| RclkH clock to RclkL | $t_{RHRLH}$ | $0.5* t_{RHRH} -110$ | $0.5* t_{RHRH} +110$ | $0.5* t_{RHRH} -177$ | $0.5* t_{RHRH} +177$ | ps |
| TclkH clock to TclkL | $t_{THTLH}$ | $0.5* t_{SCTHSCTH} -90$ | $0.5* t_{SCTHSCTH} +90$ | $0.5* t_{SCTHSCTH} -157$ | $0.5* t_{SCTHSCTH} +157$ | ps |
| RclkH[n] HIGH to RclkH[m] HIGH skew | $t_{RNHMH}$ | - | 690 | - | 790 | ps |
| RclkL[n] HIGH to RclkL[m] HIGH skew | $t_{RLNHRLMH}$ | - | 690 | - | 790 | ps |
| TclkH[n] HIGH to TclkH[m] HIGH skew | $t_{TNHMH}$ | - | 150 | - | 250 | ps |
| TclkL[n] HIGH to TclkL[m] HIGH skew | $t_{TLNHTLMH}$ | - | 150 | - | 250 | ps |
| SysclkRxH to RclkH variation | $t_{SCRHRCH}$ | - | 2.5 | | 3.0 | ns |
| SysclkRxL to RclkL variation | $t_{SCRLRCL}$ | - | 2.5 | | 3.0 | ns |
| PLL/DLL lock time | $t_{DLL}$ | - | 2 | - | 2 | ms |
| Max long term jitter of Tclk over operating range of VT | $t_{LTTCJ}$ | - | 559 | - | 931 | ps |
| Input Times | | | | | | |
| Input setup (input data valid to RclkH) | $t_{IS}$ | 230 | - | 230 | - | ps |
| Input hold (RclkH to input data invalid) | $t_{IH}$ | 230 | - | 230 | - | ps |
| Output Times | | | | | | |
| Output setup (output data valid to TclkH) | $t_{OS}$ | 325 | - | 325 | - | ps |
| Output hold (TclkH to output data invalid) | $t_{CQHQX}$ | 315 | - | 315 | - | ps |

*FIG. 11B*

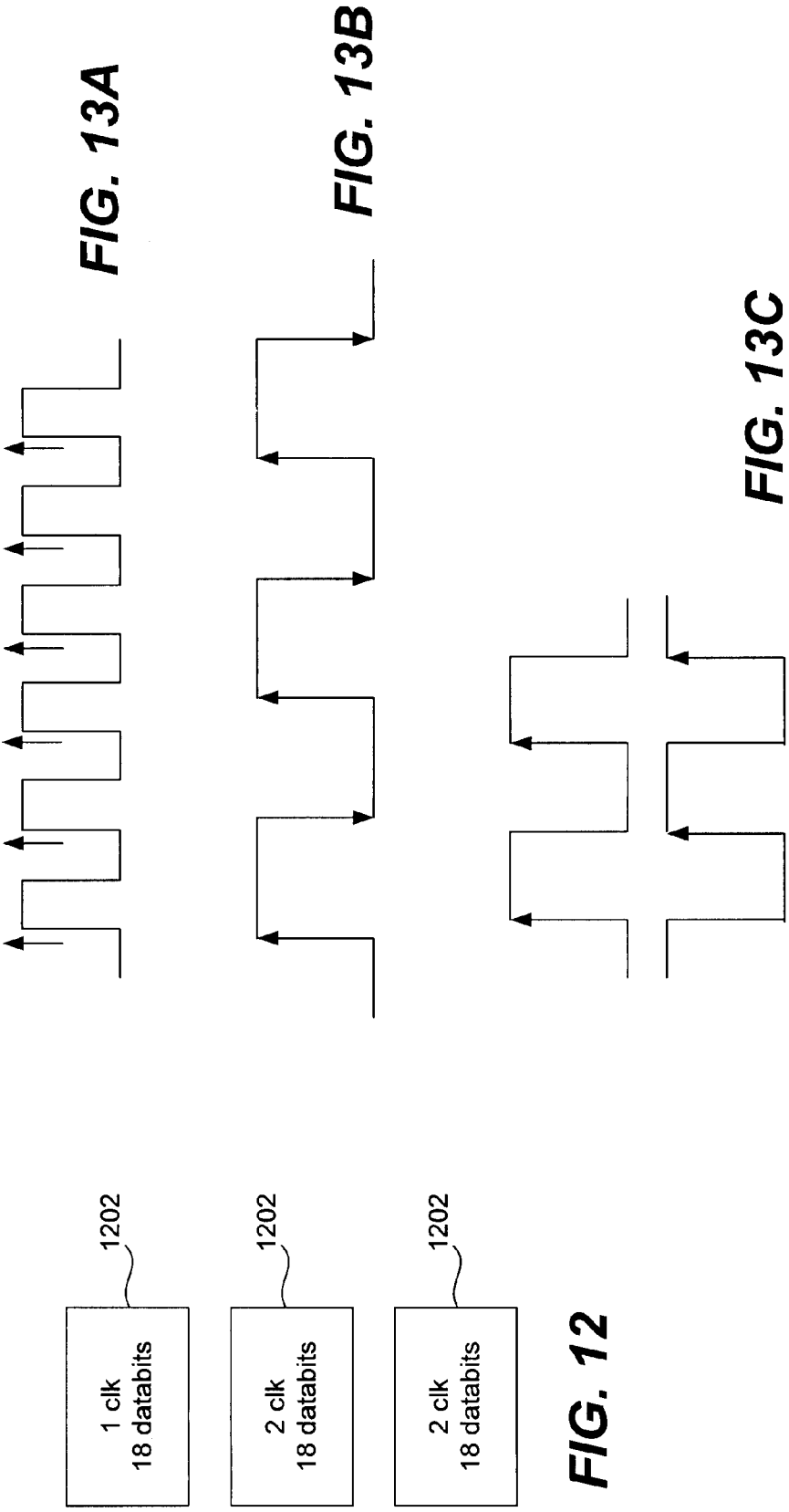

US 7,930,452 B1

PARALLEL LINK ELECTRICAL AND TIMING PARAMETER SPECIFICATION FOR OUTPUT DRIVER AND INPUT RECEIVER THAT SELECTS BANDWIDTH OR FREQUENCY BASED ON TIMING PARAMETERS

BACKGROUND

1. Technical Field

The present disclosure relates generally to methods and apparatus for implementing an electrical interface.

2. Description of the Related Art

The term "driver" may be defined as a device or transistor chip that transmits data. Similarly, the term "receiver" may be defined as a device or transistor chip that receives data. The data is typically transmitted by the driver to the receiver across an electrical interface between the driver and the receiver.

Typically, specifications for electrical interfaces only specify voltage thresholds. Moreover, the bandwidth of data transfer is often limited. In addition, with the decreasing size of transistors, implementation of electrical interfaces becomes more difficult.

BRIEF DESCRIPTION OF THE DRAWINGS

FIG. 3 is a table illustrating example DC operating conditions.

FIG. 4 is a table illustrating example AC operating conditions.

FIG. 9 is a table representing example maximum ratings of components that may be used.

FIG. 10A is a table representing example input and output capacitances (without package) that may be implemented.

FIG. 10B is a table representing example input and output capacitances (with package) that may be implemented.

FIGS. 11A-11B are tables that together represent example timing parameters that may be applied to achieve a desired frequency or bandwidth.

FIG. 12 is a diagram illustrating example clock groups that may be used to transfer data from a driver to a receiver.

FIGS. 13A-C together represent example implementations of clock signals that may be used to read data provided by a driver.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In one embodiment, an apparatus includes a driver and a receiver. The driver has an output, wherein the output of the driver has an associated output termination (i.e., output impedance). In addition, the receiver has an input, wherein the input of the receiver has an associated input termination (i.e., input impedance). An interface between the output of the driver and the input of the receiver operates according to a set of one or more timing parameters, wherein the input termination, the output termination, and the set of timing parameters correspond to a bandwidth for data transfer or frequency for data transfer across the interface between the output of the driver and the input of the receiver.

Specific Example Embodiments

Currently, one common standard supply voltage for High Speed Transistor Logic (HSTL) is 1.5 volts. However, with ever-decreasing transistor sizes, cooling technology is typically required to cool the transistor chips. As will be described in further detail below, the disclosed embodiments support the use of a lower supply voltage. The use of lower power results in reduced operating costs, as well as the elimination or mitigation of the need to cool the transistor chips. Accordingly, the cost of implementing an interface between a driver and a receiver is substantially reduced.

Figure 1:
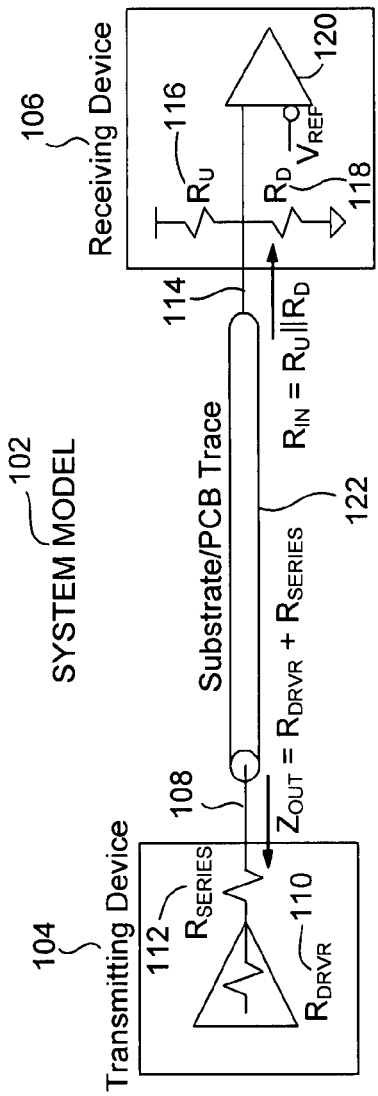
FIG. 1 is a block diagram illustrating an example system model in which various embodiments of the invention may be applied.

FIG. 1 is a block diagram illustrating an example system model in which various embodiments of the invention may be implemented. System 102 may include a driver (i.e., transmitting device) 104 and a receiver (i.e., receiving device) 106. The driver 104 has an output 108 that is series terminated such that the driver 104 has an associated output termination (i.e., impedance), represented by $Z_{OUT}$. More particularly, the output termination may be implemented by two or more resistors connected in series. In this example, the output termination is the sum of the values of the inherent driver resistor ($R_{DRVR}$) 110 that is connected in series to a series resistor ($R_{SERIES}$) 112. The desired sum may be programmable by a single external resistor.

The receiver 106 has an input 114, where the input 114 of the receiver is parallel terminated such that the receiver 106 has an associated input termination. More particularly, the input termination may be implemented by two or more resistors connected in parallel. In this example, the input termination is the result of the values of resistor $R_U$ 116 connected in parallel to resistor $R_D$ 118. The input termination may be programmable by a single external resistor (and therefore a single pin), or by separate pins to program the resistor $R_U$ 116 and the resistor $R_D$ 118.

The receiver 106 may be a differential receiver that is used with an inverting input tied to a fixed reference voltage $V_{REF}$, as shown at 120. For example, the fixed reference voltage 120 may be equal to approximately half of output supply voltage $V_{DDQ}$ (not shown). The reference voltage 120 may be externally provided (e.g., using one or more pins) and may be derived from the output supply voltage.

While the driver and receiver resistors can be programmed with external resistors as described above, it is also possible to use internal calibration instead of external resistors. Furthermore, the reference voltage 120 may be internally generated instead of externally provided. The use of internal calibration or reference voltage may be implemented to save pin count or to save external components.

An interface 122 between the output 108 of the driver 104 and the input 114 of the receiver 106 may operate according to a set of one or more timing parameters, as will be described in further detail below. More particularly, the input termination, the output termination, and the set of timing parameters may correspond to a bandwidth for data transfer or frequency for data transfer across the interface 122 between the output 108 of the driver 104 and the input 114 of the receiver 106.

The disclosed embodiments enable the interface 122 to operate according to a nominal supply voltage of approximately 1.2 Volts. More particularly, the interface 122 may operate according to a supply voltage within a range between approximately 1.14 Volts and approximately 1.26 Volts. Since the interface 122 may operate according to a lower supply voltage than typically supported, the transistor chips used to implement the driver 104 and the receiver 106 may be smaller. For instance, the transistor chips may have a minimum transistor feature size of less than or equal to approximately 90 nm.

Figure 2:
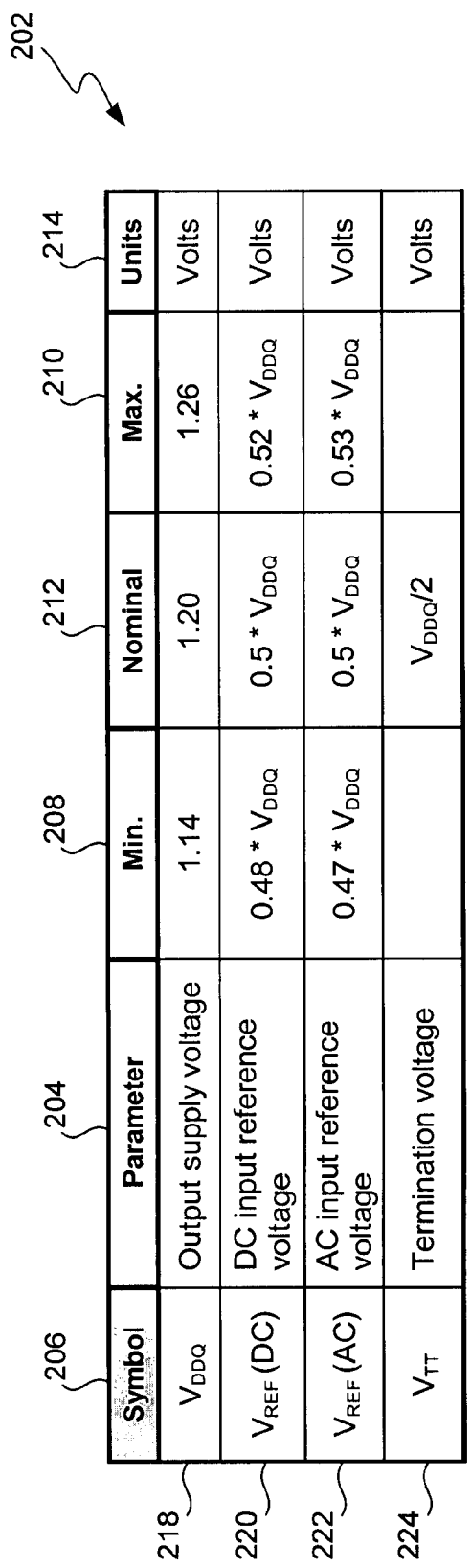
FIG. 2 is a table illustrating example supply voltage levels.

FIG. 2 is a table illustrating example supply voltage levels. Table 202 identifies supply voltage levels for each Parameter 204 identified by corresponding Symbol 206. Supply voltage levels for each Parameter 204 may include a Minimum (Min.) voltage level 208, a Maximum (Max.) voltage level 210, and/or a Nominal voltage level 212. Each voltage level is represented in Units 214 of Volts. Each of these voltage levels may be seen at an input pin of a package on a circuit board, or at a bump on a chip where a high density substrate is used. In the case of asymmetric settings by design (e.g., different supply voltages at the driver and receiver, or unequal pull-up and pull-down input terminators), Ohm's Law may be used to solve the DC circuit for the common mode voltage, defined as half of the sum of the input High and Low DC voltages at the receiver. The calculated common mode voltage may then be used to replace $0.5*V_{DDQ}$ in the table 202.

Voltage levels for the Output supply voltage ($V_{DDQ}$) are shown at 218. More particularly, the minimum voltage level 208 is 1.14 Volts, the nominal voltage level 212 is 1.20 Volts, and the maximum voltage level 210 is 1.26 Volts. Similarly, the voltage levels for the DC input reference voltage $V_{REF}$ (DC) are shown at 220. More particularly, the minimum voltage level 208 is $0.48*V_{DDQ}$ Volts, the nominal voltage level 212 is $0.5*V_{DDQ}$ Volts, and the maximum voltage level 210 is $0.52*V_{DDQ}$ Volts. The voltage levels for the AC input reference voltage $V_{REF}$ (AC) are shown at 222. As shown, the minimum voltage level 208 is $0.47*V_{DDQ}$ Volts, the nominal voltage level 212 is $0.5*V_{DDQ}$ Volts, and the maximum voltage level 210 is $0.53*V_{DDQ}$ Volts. $V_{DDQ}$ is the power supply voltage for the device receiving the $V_{REF}$ input. $V_{REF}$ (AC) is $V_{REF}$ (DC) plus noise.

The voltage levels for the termination voltage $V_{TT}$ are shown at 224. As shown, the nominal voltage level 212 is $0.5*V_{DDQ}$ Volts. The termination voltage $V_{TT}$ may be supplied by an independent power supply or created through a Thevenin equivalent circuit.

FIG. 3 is a table illustrating example DC operating conditions. Table 302 identifies example DC operating conditions for each Parameter 304 identified by corresponding Symbol 306. Supply voltage levels for each Parameter 304 may include a Minimum (Min.) voltage level 308 and/or a Maximum (Max.) voltage level 310. Each voltage level is represented in Units 312 of Volts. DC operating conditions for DC output high voltage ($V_{OH}$(DC)) are shown at 316. More particularly, the minimum voltage level 308 is $0.75*V_{DDQ}$ Volts, while the maximum voltage level 310 is $V_{DDQ}$+0.15 Volts. DC operating conditions for DC output low voltage ($V_{OL}$ (DC)) are shown at 318. More particularly, the minimum voltage level 308 is –0.15 Volts, and the maximum voltage level 310 is $0.25*V_{DDQ}$ Volts. DC operating conditions for DC input high voltage ($V_{IH}$(DC)) are shown at 320. More particularly, the minimum voltage level 308 is $V_{REF}$+0.08 Volts, while the maximum voltage level is $V_{DDQ}$+0.15 Volts. DC operating conditions for DC input low voltage ($V_{IL}$(DC)) are shown at 322. More particularly, the minimum voltage level 308 is –0.15 Volts and the maximum voltage level 310 is $V_{REF}$–0.08 Volts. In one embodiment, for devices that are designed for hot insertion or power down on an active bus, the maximum input voltage may be 1.26 Volts, regardless of the level of $V_{DDQ}$.

FIG. 4 is a table illustrating example AC operating conditions. Table 402 identifies example AC operating conditions for each Parameter 404 identified by corresponding Symbol 406. More particularly, minimum levels 408 and maximum levels 410 are presented with corresponding units 411. Values for minimum output pullup under AC test load ($V_{OH}$(AC)) 412 include a minimum value 408 of $V_{DDQ}$–0.4 Volts and a maximum value 410 of $V_{DDQ}$+0.24 Volts. Values for maximum output pulldown under AC test load ($V_{OL}$(AC)) 414 include a minimum value 408 of –0.24 Volts and a maximum value 410 of 0.4 Volts. Values for AC input high voltage ($V_{IH}$(AC)) 416 include a minimum value 408 of $V_{REF}$+0.15 Volts and a maximum value 410 of $V_{DDQ}$+0.24 Volts. Values for AC input low voltage ($V_{IL}$(AC)) 418 include a minimum value 408 of –0.24 Volts and a maximum value 410 of $V_{REF}$–0.15 Volts.

Slew rate ($t_{SLEW}$) 420 may be a minimum value 408 of 1.0 Volts/ns. Difference between rising and falling slew rates ($\Delta t_{SLEW}$) may be a maximum 410 of 10 percent. The difference between rising and falling slew rates may be defined by $$|[t_{SLEW(rising)} - t_{SLEW(falling)}]|/\tfrac{1}{2}[t_{SLEW(rising)} \pm t_{SLEW(falling)}]$$

Figure 5:
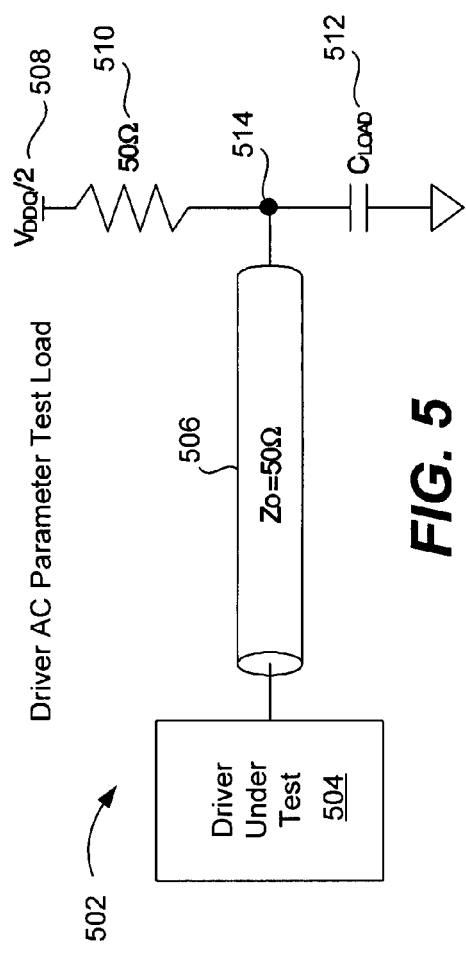
FIG. 5 is an example of a system that may be used to test AC parameters.

FIG. 5 is an example of a system that may be used to test AC parameters. As shown, the system 502 may be used to ensure that a Driver Under Test 504 driving a test load capacitance $C_{LOAD}$ 512 through a transmission line of impedance Zo 506 operates as desired. In this example, the output impedance Zo 506 is 50 Ohms. A voltage $V_{DDQ}/2$ may be applied at 508 to a resistance 510, which may be connected to the test load capacitance $C_{LOAD}$ 512. In this example, the resistance 510 is 50 Ohms. AC parameters may be measured at 514 to ensure that the Driver Under Test 504 is meeting the desired operating parameter values, such as those described above with reference to FIG. 4.

Figure 6:
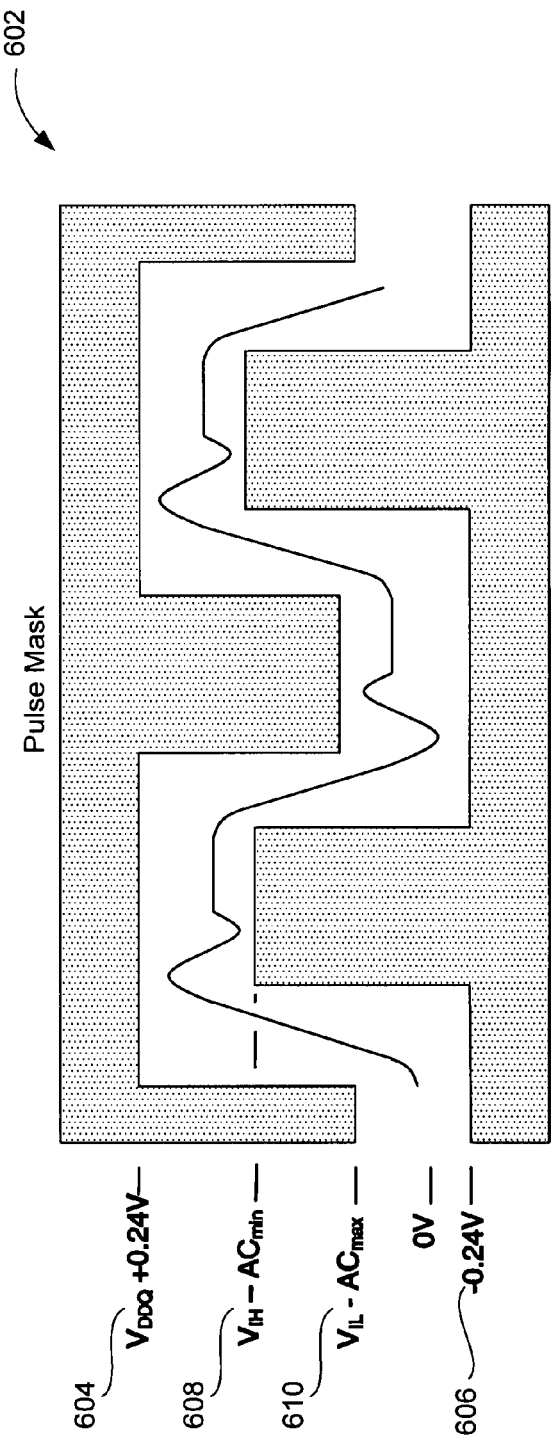
FIG. 6 is a pulse mask indicating example ranges of values of AC parameters.

A pulse mask may be used to ensure that a Driver Under Test is meeting desired operating parameter values. FIG. 6 is an example pulse mask indicating acceptable ranges of values of AC parameters. The pulse mask 602 indicates a maximum AC input high voltage ($V_{IL}$(AC)) 604, $V_{DDQ}$+0.24 V, as indicated at 416 of FIG. 4. Similarly, the pulse mask 602 indicates a minimum AC input low voltage ($V_{IL}$(AC)) 606, which is –0.24 V, as set forth above with reference to 418 of FIG. 4. The pulse mask 602 is similarly bounded in this example at 608 and 610, which are indicated by $V_{IH}$–ACmin and $V_{IL}$–ACmax, respectively. ACmin and ACmax are respectively the minimum and maximum voltage of the AC waveform.

The output impedance may be calibrated by using a calibration resistor. Similarly, the input impedance may be calibrated by using two calibration resistors. More particularly, the input impedance and output impedance may be selected such that the desired voltage and timing parameters are met.

The input impedance and/or output impedance may be programmed in a variety of ways. For instance, the input termination may be programmed using a single external resistor or two resistors, as will be described in further detail below with reference to FIG. 7A and FIG. 7B, respectively.

Figure 7A:
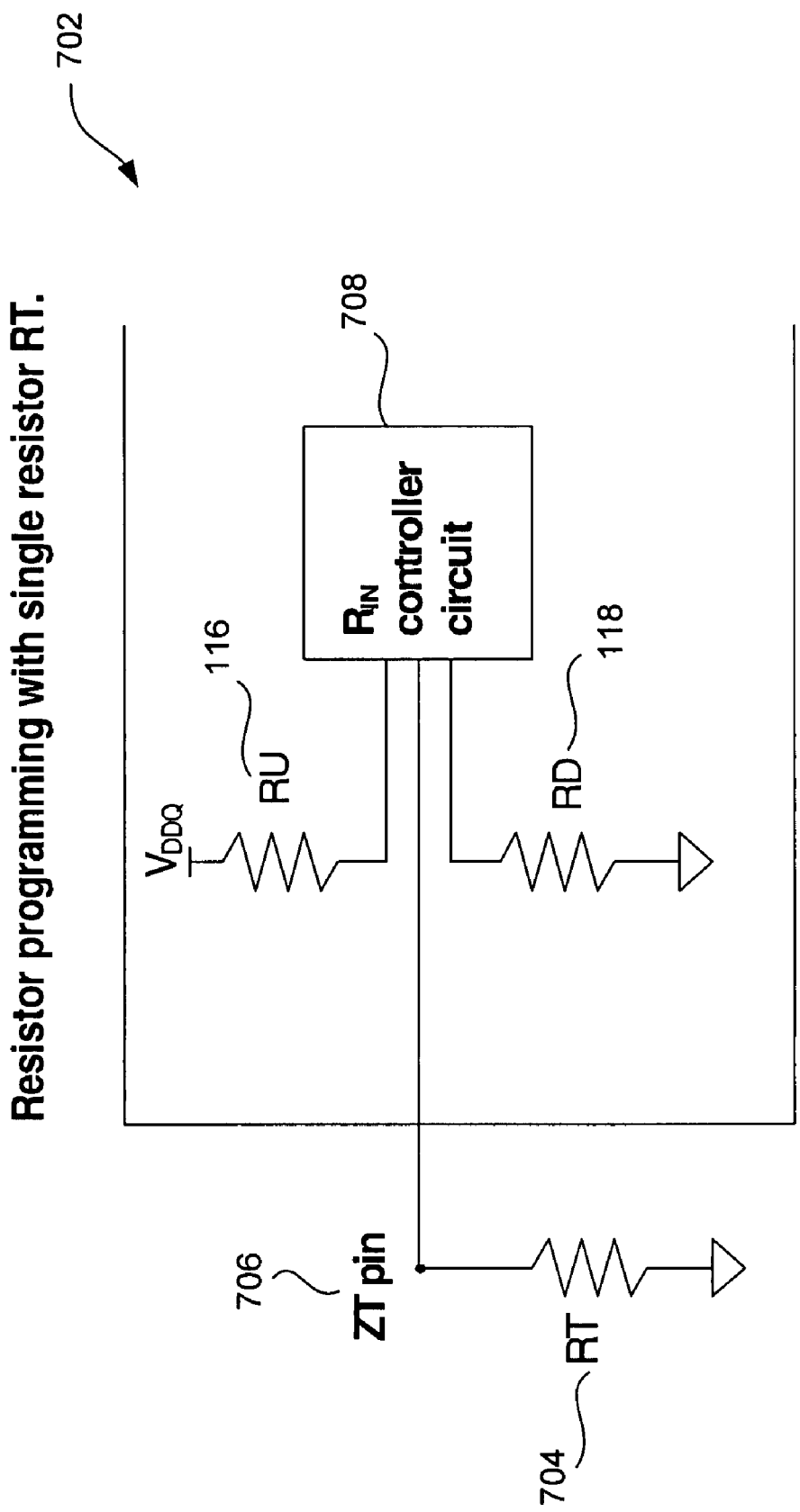
FIG. 7A is an example circuit that may be used to program the input impedance with a single pin.

FIG. 7A is an example circuit that may be used to program the input impedance with a single pin. As shown at 702, the input termination may be programmed using an external resistor RT 704, which is shown here connected to a pin, ZT pin 706.

In this example, the input termination is the result of the values of resistor $R_U$ 116 connected in parallel to resistor $R_D$ 118. Impedance control circuit, $R_{IN}$ controller circuit 708, may program the two resistors, $R_U$ 116 and $R_D$ 118, in response to the external resistor RT 704. For instance, the two resistors, $R_U$ 116 and $R_D$ 118, may be programmed such that they are equal to the resistor value RT 704. As another example, in pullup only mode (e.g., by setting a pullup-only mode bit), $R_U$ 116 may be programmed such that it is equal to the resistor value RT 704. Termination may also be disabled by setting a disable terminator mode bit.

Figure 7B:
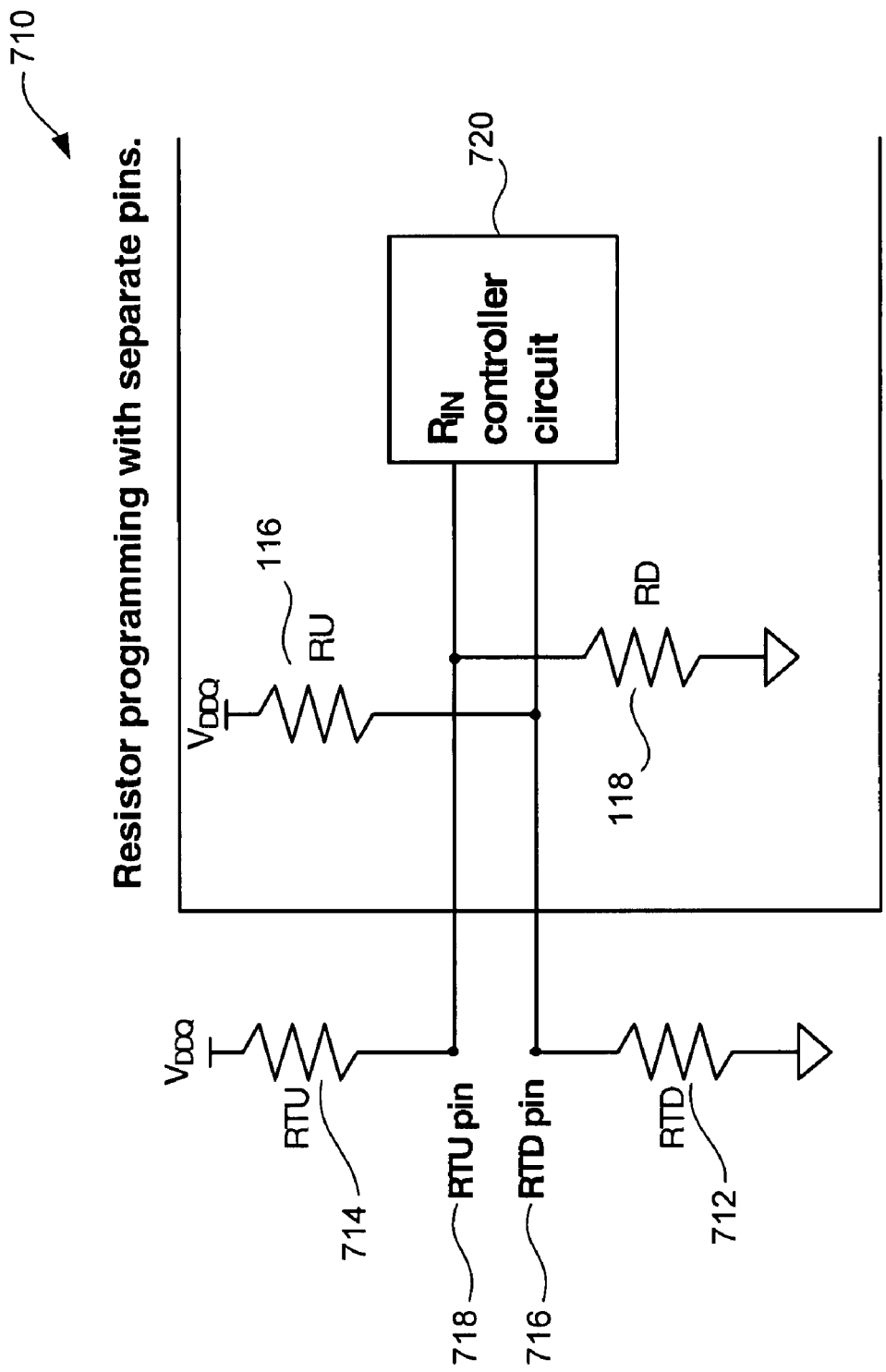
FIG. 7B is an example circuit that may be used to program the input impedance with separate pins.

FIG. 7B is an example circuit that may be used to program the input impedance with separate pins. As shown at 710, the input termination may be programmed using two external resistors, RTD 712 and RTU 714, which are shown connected to pins RTD pin 716 and RTU pin 718, respectively. Thus, in this example, separate pins are used to program the resistor $R_U$ 116 and the resistor $R_D$ 118. The impedance control circuit, $R_{IN}$ controller circuit 720, may program the two resistors, $R_U$ 116 and $R_D$ 118, in a variety of ways. The input impedance may be digitally controlled and automatically set during chip reset.

In accordance with one embodiment, the selection of an input impedance value determines a corresponding range of values allowed by the output impedance. Similarly, the selection of an output impedance value determines a corresponding range of values allowed by the input impedance.

Figure 8:
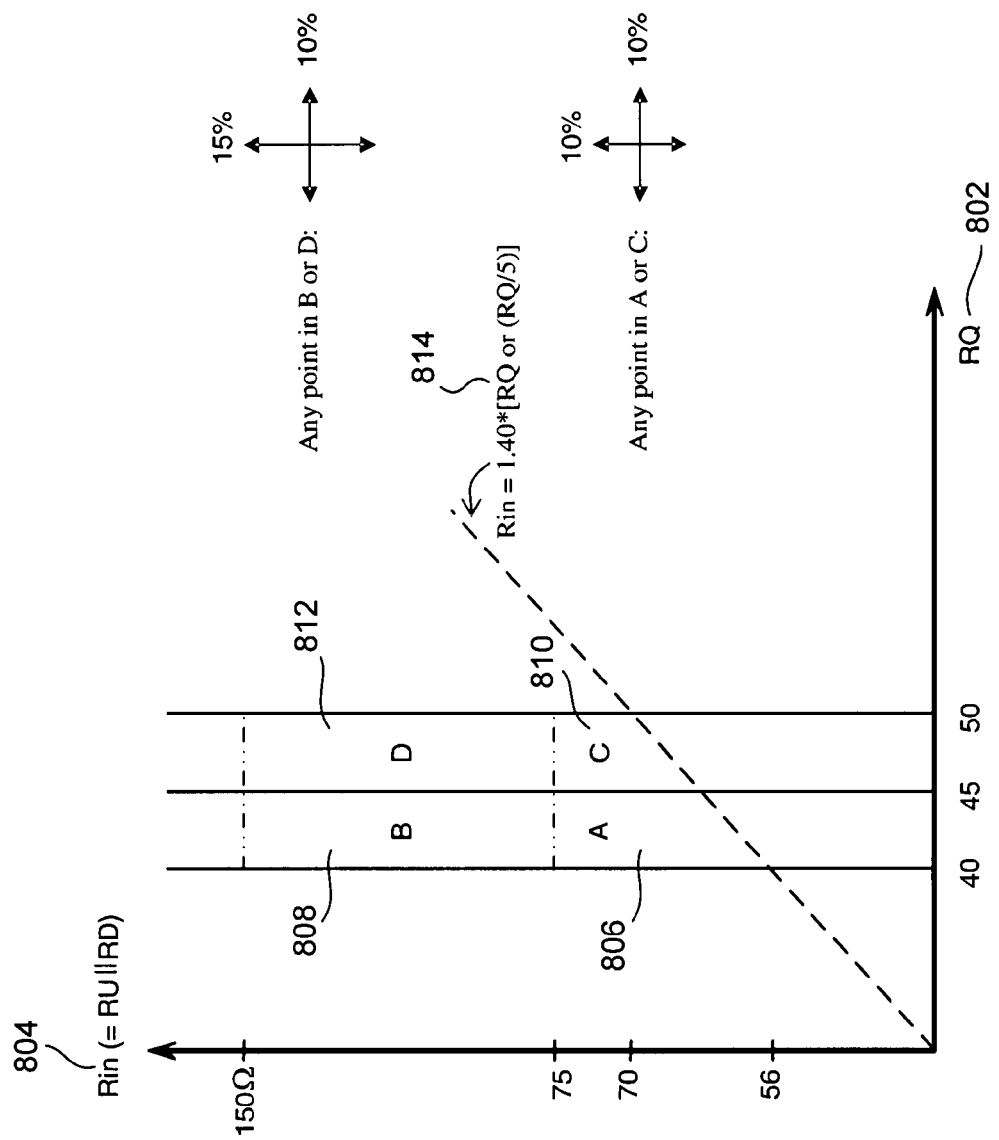
FIG. 8 is an example graph representing input impedance and output impedance values that may be selected.

FIG. 8 is a graph representing example input impedance and output impedance values that may be selected. More particularly, FIG. 8 represents the relationship between the input impedance and output impedance values. In this example, the output impedance RQ values associated with the driver are represented along the x-axis, as shown at 802, while the input impedance Rin values associated with the receiver are represented along the y-axis, as shown at 804. As shown, the output impedance of both data and clock signals may range from approximately 40 Ohms to approximately 50 Ohms, while the input impedance of both data and clock signals may range from approximately 56 to approximately 150 Ohms.

In this example, the ranges of values permissible for the input and output impedance are represented by regions A, B, C, and D, shown at 806, 808, 810, and 812, respectively. The minimum values permissible for the input impedance is bounded by the line Rin=1.40*[RQ or (RQ/5)] at 814. As shown in FIG. 8, Rin represents the input impedance values along the y axis, while RQ represents the output impedance values along the x axis. In addition, as shown in FIG. 8, the maximum input impedance is approximately 150 Ohms. The resistor values may be nominal values with a tolerance of approximately 10-15%. More particularly, in this example, the values represented in regions A and C may have a tolerance of approximately 10%, while the values represented in regions B and D may have a tolerance of approximately 10% in the output impedance values, and approximately 15% in the input impedance values.

As shown in FIG. 8, the output impedance for regions A and B may be between approximately 40 Ohms and approximately 45 Ohms, while the output impedance for regions C and D may be between approximately 45 Ohms and approximately 50 Ohms. The input impedance for regions A and C may be between approximately 1.40*[RQ or (RQ/5)] and approximately 75 Ohms. Similarly, the input impedance for regions B and D may be between approximately 75 Ohms and 150 Ohms.

By selecting a bandwidth or frequency for data transfer across an interface between an output of a driver and an input of a receiver, the input impedance and output impedance to be used in achieving the selected bandwidth or frequency may be identified. For instance, for a frequency of greater than or equal to approximately 500 MHz (or a bandwidth of greater than or equal to approximately 1 Gbps), region A or B may be used to identify input impedance and output impedance values. As shown in FIG. 8, the output termination in regions A and B is between approximately 40 Ohms and approximately 45 Ohms, while the input termination is between approximately 56 Ohms and approximately 150 Ohms. For a frequency of approximately 300 to approximately 500 MHz (or a bandwidth of approximately 600 Mbps to approximately 1 Gbps), region A, B, or C may be used to identify input impedance and output impedance values. For a frequency of less than or equal to approximately 300 MHz (or a bandwidth of less than or equal to approximately 600 Mbps), region A, B, C, or D may be used to identify input impedance and output impedance values. In this example, region A illustrates the use of a high-current ("strong") driver and a high-power ("strong") input terminator, which may be used to achieve peak performance of the interface. Region B illustrates the use of a high-current driver and a low-power input terminator, while region C illustrates the use of a low-current driver and a high-power input terminator. Region D illustrates the use of a low-current driver and a low-power input terminator, which provides the lowest power, but also potentially more noise than the other regions. Thus, by selecting an input impedance value within the corresponding region, a range of permissible output impedance values may be identified. Similarly, by selecting an output impedance value within the corresponding region, a range of permissible input impedance values may be identified.

FIG. 9 is a table 900 representing example maximum ratings of components that may be used to implement the disclosed embodiments. For each parameter 902, a minimum 904 and a maximum 906 voltage is identified. More particularly, a voltage on $V_{DDQ}$ relative to GROUND (or $V_{SS}$ 908) may be a minimum of −0.2 Volts up to a maximum of 1.4 Volts. Moreover, the input voltage 910 may be a minimum of −0.2 Volts up to a maximum of 1.5 Volts.

FIG. 10A is a table representing example input and output capacitances (without package) that may be implemented in the disclosed embodiments. For each parameter 1002, a typical capacitance value 1004 and maximum capacitance 1006 are represented in units 1008 of pF. More particularly, the address and control input capacitance 1010, data input and output capacitance 1012, and clock input and output capacitance 1014 may have a typical value of 2 pF and a maximum value of 3 pF.

FIG. 10B is a table representing example input and output capacitances (with package) that may be implemented in the disclosed embodiments. For each parameter 1020, a typical capacitance value 1022 and maximum capacitance 1024 are represented in units 1026 of pF. More particularly, the address and control input capacitance 1028, data input capacitance 1030, clock input capacitance 1032, data output capacitance 1034, and clock output capacitance 1036 may have a typical value of 3.5 pF and a maximum value of 4.5 pF.

In one embodiment, all inputs and outputs are clock-centered, with a 90-degree phase delay of the clock, either on die or on board. More particularly, the rising edges are taken off of two separate, complementary clocks, where one clock provides a 180 degree phase shift from the other clock. Thus, all address, control, and data signals may be read on these two sets of rising edges with balanced setup and hold times. Other embodiments may not use two complementary clocks, but rather may use a differential clock pair, or a single clock at either the frequency of data transfer, or twice that frequency.

FIGS. 11A-11B are tables that together represent example timing parameters that may be applied to the system to achieve a desired frequency or bandwidth. For each parameter 1102, the corresponding symbol 1104, minimum value 1106 to achieve a bandwidth of 1.0 Gbps, maximum value 1108 to achieve a bandwidth of 1.0 Gbps, minimum value 1109 to achieve a frequency of 600 Mbps, maximum value 1110 to achieve a frequency of 600 Mbps, and corresponding units 1111 are provided. In the following description, Sysclk refers to the system input clock, which is split into SysclkTxH for the Transmitter (Tx) chip, and SysclkRxL for the Receiver (Rx) chip. H is used to designate high, while L is used to designate low. TclkH/TclkL are Tx clocks that correspond to Tx data. RclkH/RclkL are Rx clocks that correspond to Rx data.

The parameters 1102 include SysclkTxH and SysclkTxL cycle time 1112, SysclkRxH and SysclkRxL cycle time 1114, RclkH and RclkL cycle time 1116, TclkH and TclkL cycle time 1118, Short term SysclkTx phase jitter 1120, Short term SysclkRx phase jitter 1122, Short term Rclk phase jitter 1124, Short term Tclk phase jitter 1126, Maximum long term input jitter 1128, SysclkTxH and SysclkTxL HIGH pulse width 1130, SysclkTxH and SysclkTxL LOW pulse width 1132, SysclkRxH and SysclkRxL HIGH pulse width 1134, SysclkRxH and SysclkRxL LOW pulse width 1136, RclkH and RclkL HIGH pulse width 1138, RclkH and RclkL LOW pulse width 1140, TclkH and TclkL HIGH pulse width 1142, TclkH and TclkL LOW pulse width 1144, SysclkTxH clock to SysclkTxL 1146, SysclkRxH clock to SysclkRxL 1148, RclkH clock to RclkL 1150, TclkH clock to TclkL 1152, RclkH[n] HIGH to RclkH[m] HIGH skew 1154, RclkL[n] HIGH to RclkL[m] HIGH skew 1156, TclkH[n] HIGH to TclkH[m] HIGH skew 1158, TclkL[n] HIGH to TclkL[m] HIGH skew 1160, SysclkRxH to RclkH variation 1162, SysclkRxL to RclkL variation 1164, PLL/DLL lock time 1166 (the time needed for the Phase Locked Loop PLL or the Delay Locked Loop DLL to lock), Maximum long term jitter of Tclk over operating range of voltage and temperature 1168, Input setup time (input data valid to RclkH) 1170, Input hold time (RclkH to input data invalid) 1172, Output setup time (output data valid to TclkH) 1174, and Output hold time (TclkH to output data invalid) 1176.

By selecting a bandwidth or frequency for data transfer across an interface between an output of a driver and an input of a receiver, a set of timing parameter values to be used in achieving the selected bandwidth or frequency may be identified.

In the interface between a driver and receiver, one or more clock groups may be implemented. FIG. 12 is a diagram illustrating example clock groups 1202 that may be used to transfer data from a driver to a receiver. Each of the clock groups may include one or two clocks. Moreover, each clock group enables a tight relationship between one or two clock signals and a plurality of bits of data. The clock signal(s) in a particular clock group may indicate when the plurality of bits of data are to be read. In this example, each clock group includes 18 pins corresponding to 18 bits, and either one or two pins corresponding to the clock(s) for that clock group. Pin function and pin name associated with each pin of the interface may be user definable. In one embodiment, the interface is non-adaptive such that data can be transmitted from the driver to the receiver across the interface without a training sequence.

Each clock group may be independent of other clock groups. For instance, the clock of one of the clock groups may be independent of the clock of the remaining clock groups. The clock(s) of each clock group may be referred to as an Input/Output clock.

In one embodiment, a core clock indicates a frequency with which data bits are processed by the receiver. In contrast, an Input/Output clock may indicate a frequency with which data is transmitted by the driver to the receiver. In other words, the core clock may be separate from the Input/Output clock such that the frequency with which data bits are processed by the receiver is different from the frequency with which data is transmitted by the driver to the receiver.

FIGS. 13A-C together represent example implementations of clock signals that may be used to read data provided by a driver. Each of the clock groups may include a single clock. As shown in FIG. 13A, a single clock signal may be used such that data is read at the rising edge of the clock signal. Thus, the clock may be run at twice the frequency of data transfer. Alternatively, as shown in FIG. 13B, the plurality of bits are read at both the rising and falling edge of a single clock signal. Thus, the clock may be run at 50% duty cycle. FIG. 13C illustrates the use of two different clock signals that are complementary (i.e., phase-shifted 180 degrees from each other), and the reading of data off of only the rising (or only falling) edge of both clock signals. Thus, the two different clock signals may be differentially generated and differentially received. For the same bandwidth of data transfer the clock in FIG. 13A should run at twice the clocks in FIG. 13B and FIG. 13C. In this embodiment, an additional pin may be used for the second clock signal.

Through the use of the disclosed embodiments, different vendors may implement a driver and a receiver for use with an interface complying with the disclosed embodiments. Accordingly, the disclosed embodiments ensure that the resulting driver and receiver will successfully interoperate. The functionality for the disclosed embodiments may be implemented in software, hardware, or any combination of hardware and software. Moreover various disclosed processes may be performed manually (e.g., by selecting and/or configuring desired parameters).

Yet another embodiment of the invention pertains to computer program products including machine-readable media on which are provided program instructions for implementing the methods and techniques described herein, in whole or in part. Any of the methods described herein may be represented, in whole or in part, as program instructions that can be provided on such machine-readable media.

In addition, the disclosed embodiments pertain to various combinations and arrangements of data generated and/or used as described herein. For example, structures having the format described herein and provided on appropriate media are part of this disclosure.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
 selecting a bandwidth or frequency for data transfer across an interface between an output of a driver and an input of a receiver, wherein the driver has an associated output termination and wherein the receiver has an associated input termination; and
 identifying a set of parameter values to be used in achieving the selected bandwidth or frequency, wherein the set of parameter values include a value for each one of a set of parameters, wherein the set of parameters include one or more timing parameters, the input termination, and the output termination.

2. The method as recited in claim 1, wherein the output of the driver is series terminated such that the driver has an associated output termination and wherein the input of the receiver is parallel terminated such that the receiver has an associated input termination.

3. The method as recited in claim 1, wherein the value of the input termination is one of a range of values corresponding to the value of the output termination.

4. The method as recited in claim 1, wherein the value of the output termination is one of a range of values corresponding to the value of the input termination.

5. An apparatus including a processor and a memory, comprising:
 a driver having an output, wherein the output of the driver has an associated output termination;
 a receiver having an input, wherein the input of the receiver has an associated input termination; and
 an interface between the output of the driver and the input of the receiver, wherein the interface operates according to a set of one or more timing parameters;
 wherein the input termination, the output termination, and the set of timing parameters correspond to a bandwidth for data transfer or frequency for data transfer across the interface between the output of the driver and the input of the receiver.

6. The apparatus as recited in claim 5, wherein the output of the driver is series terminated and the input of the receiver is parallel terminated.

7. The apparatus as recited in claim 5, wherein the output termination is programmable.

8. The apparatus as recited in claim 5, wherein the input termination is programmable.

9. The apparatus as recited in claim 5, wherein the interface is non-adaptive such that data can be transmitted from the driver to the receiver across the interface without a training sequence.

10. The apparatus as recited in claim 5, wherein pin function and pin name associated with each pin of the interface are user definable.

11. The apparatus as recited in claim 5, wherein the interface includes one or more clock groups and wherein each of the clock groups includes at least one clock and a plurality of pins, wherein the at least one clock indicates a frequency with which data is transmitted by the plurality of pins.

12. The apparatus as recited in claim 11, wherein each of the clock groups includes two clocks, which are two complementary clocks.

13. The apparatus as recited in claim 11, wherein each of the clock groups includes two clocks, which are 180 degrees phase-shifted with respect to each other.

14. The apparatus as recited in claim 11, wherein each of the clock groups includes one clock, which are run at 50% duty-cycle.

15. The apparatus as recited in claim 11, wherein each of the clock groups includes one clock, which are run at twice the frequency of data transfer.

16. The apparatus as recited in claim 11, wherein the clock of one of the clock groups is independent of the clock of the remaining clock groups.

17. The apparatus as recited in claim 5, further comprising:
 a core clock indicating a frequency with which data bits are processed by the receiver; and
 an Input/Output clock indicating a frequency with which data is transmitted by the driver to the receiver, wherein the core clock is separate from the Input/Output clock such that the frequency with which data bits are processed by the receiver is different from the frequency with which data is transmitted by the driver to the receiver.

18. The apparatus as recited in claim 5, wherein a value of the input termination is one of a range of values corresponding to a value of the output termination.

19. The apparatus as recited in claim 5, wherein a value of the output termination is one of a range of values corresponding to a value of the input termination.

20. The apparatus as recited in claim 5, wherein each of the set of timing parameters has a value within a corresponding range of values, wherein each of the corresponding range of values corresponds to the bandwidth or frequency.

21. The apparatus as recited in claim 5, wherein the apparatus is adapted for operating according to a supply voltage of approximately 1.2 Volts.

22. The apparatus as recited in claim 5, wherein the apparatus is adapted for operating according to a supply voltage within a range between approximately 1.14 Volts and approximately 1.26 Volts.

23. The apparatus as recited in claim 5, wherein there is a driver and a receiver chip.

24. The apparatus as recited in claim 23, wherein the driver chip and the receiver chip are implemented in technology having a minimum transistor feature size of less than or equal to approximately 90 nm.

25. The apparatus as recited in claim 5, wherein the input impedance is greater than or equal to approximately 1.40*the output impedance and less than or equal to approximately 150 Ohms.

26. The apparatus as recited in claim 5, wherein the frequency for data transfer is within a range of values less than or equal to approximately 300 Mhz or the bandwidth for data transfer is within a range of values less than or equal to approximately 600 Mbps.

27. The apparatus as recited in claim 26, wherein the output impedance is between approximately 40 Ohms and approximately 50 Ohms.

28. The apparatus as recited in claim 5, wherein the frequency for data transfer is within a range of values between approximately 300 Mhz to approximately 500 Mhz or the bandwidth for data transfer is within a range of values between approximately 600 Mbps to approximately 1.0 Gbps.

29. The apparatus as recited in claim 28, wherein the output impedance is between approximately 40 Ohms and approximately 50 Ohms.

30. The apparatus as recited in claim 5, wherein the frequency for data transfer is greater than or equal to approximately 500 Mhz or the bandwidth for data transfer is greater than or equal to approximately 1.0 Gigabit per second.

31. The apparatus as recited in claim 30, wherein the output termination is between approximately 40 Ohms and approximately 45 Ohms.

32. The apparatus as recited in claim 31, wherein the input termination is between approximately 56 Ohms and approximately 150 Ohms.

33. An apparatus, comprising:
   means for selecting a bandwidth or frequency for data transfer across an interface between an output of a driver and an input of a receiver, wherein the driver has an associated output termination and wherein the receiver has an associated input termination; and
   means for identifying a set of parameter values to be used in achieving the selected bandwidth or frequency, wherein the set of parameter values include a value for each one of a set of parameters, wherein the set of parameters include one or more timing parameters, the input termination, and the output termination.

34. The method as recited in claim 1, wherein the timing parameters include at least one of system input clock transmitter cycle time, system input clock receiver cycle time, receiver clock cycle time, transmitter clock cycle time, short term system input clock transmitter phase jitter, short term system input clock receiver phase jitter, short term receiver clock phase jitter, short term transmitter clock phase jitter, maximum long term input jitter, system input clock transmitter pulse width, system input clock receiver pulse width, receiver clock pulse width, or transmitter clock pulse width.

35. The method as recited in claim 1, wherein the timing parameters include at least one of SysclkTxH clock to SysclkTxL, SysclkRxH clock to SysclkRxL, RclkH clock to RclkL, TclkH clock to TclkL, RclkH[n] HIGH to RclkH[m] HIGH skew, RclkL[n] HIGH to RclkL[m] HIGH skew, TclkH[n] HIGH to TclkH[m] HIGH skew, TclkL[n] HIGH to TclkL[m] HIGH skew, SysclkRxH to RclkH variation, SysclkRxL to RclkL variation, PLL/DLL lock time, or maximum long term jitter of Tclk over operating range of voltage and temperature.

36. The method as recited in claim 1, wherein the timing parameters include at least one of input setup time, input hold time, output setup time, or output hold time.

* * * * *